United States Patent
Niimi et al.

(10) Patent No.: US 6,724,124 B2
(45) Date of Patent: Apr. 20, 2004

(54) ROTARY ELECTRIC MACHINE HAVING COLLAR FOR RESTRICTING COIL END EXPANSION

(75) Inventors: Masami Niimi, Handa (JP); Yasuyuki Wakahara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/310,042

(22) Filed: Dec. 5, 2002

(65) Prior Publication Data

US 2003/0107295 A1 Jun. 12, 2003

(30) Foreign Application Priority Data

Dec. 7, 2001 (JP) ......................................... 2001-374038

(51) Int. Cl.[7] ................................................. H02K 3/46
(52) U.S. Cl. ........................ 310/270; 310/239; 310/271
(58) Field of Search ................................ 310/270, 271, 310/154.01, 239, 208, 214

(56) References Cited

U.S. PATENT DOCUMENTS

| | | | | |
|---|---|---|---|---|
| 1,224,518 A | * | 5/1917 | Apple | 29/598 |
| 3,521,101 A | * | 7/1970 | Arora | 310/233 |
| 3,866,073 A | * | 2/1975 | Gjaja | 310/260 |
| 4,126,799 A | * | 11/1978 | Iogansen et al. | 310/260 |
| 5,086,247 A | * | 2/1992 | Morishita et al. | 310/270 |
| 5,485,050 A | * | 1/1996 | Zimmermann | 310/260 |
| 5,508,577 A | * | 4/1996 | Shiga et al. | 310/201 |
| 5,739,617 A | | 4/1998 | Katoh et al. | |
| 6,018,209 A | | 1/2000 | Katoh et al. | |

* cited by examiner

Primary Examiner—Thanh Lam
(74) Attorney, Agent, or Firm—Oliff & Berridge, PLC

(57) ABSTRACT

In a rotary electric machine, a collar for restricting expansion of coil ends includes a boss fitted on an armature rotation shaft, a flange radially extending from the boss and a pressing portion for pressing coil ends toward an armature core. The thickness of the boss is greater than that of the flange, so that the force F1 that is caused by deflection of the flange when coil ends expand due to a temperature increase is smaller than the force F2 that is required to remove the boss from the rotation shaft. The force F1 is applied to the boss in a direction that the collar separates from the armature core. Because the pressing portion presses against the coil ends toward the armature core through an insulation ring, the coil ends are restricted from expanding by a centrifugal force when the armature rotates.

14 Claims, 5 Drawing Sheets

ROTARY ELECTRIC MACHINE HAVING COLLAR FOR RESTRICTING COIL END EXPANSION

CROSS REFERENCE TO RELATED APPLICATION

This application is based on Japanese Patent Application No. 2001-374038 filed on Dec. 7, 2001, the disclosure of which is incorporated herein by reference.

FIELD OF THE INVENTION

The present invention relates to a rotary electric machine in which coil ends of upper layer coils mounted on an armature core constructs a commutator.

BACKGROUND OF THE INVENTION

In a rotary electric machine disclosed in JP-A-8-168225 (U.S. Pat. Nos. 5,739,617 and 6,018,209), coil ends of upper layer coils installed in an armature core are used as a commutator. Collars are fixed on an armature rotation shaft to restrict the coil ends from expanding or separating from axial ends of the armature core due to a centrifugal force during the armature rotation.

Each of the collars has a cylindrical portion fitted around the rotation shaft, a flange integrated with the cylindrical portion, and a ring-shaped pressing portion bent from the outer circumferential edge of the flange toward the coil ends of the upper layer coils. The pressing portion presses the coil ends through an insulator.

In this rotary electric machine, when the upper layer coils and lower layer coils are supplied with electricity, the coils generate heat and thermally expand. Because the upper layer coils and the lower layer coils are made of low electric resistance material such as copper and the armature core and the rotation shaft are, for example, made of iron, the coils have a coefficient of thermal expansion greater than that of the armature core and rotation shaft. Therefore, the thermal expansion of the coils causes a force pushing the collar.

The force is exerted to the collar in a direction removing the collar from the rotation shaft, that is, a direction separating from the armature core. When the collar is moved from the predetermined position by the force, the pressing portion cannot press the coil ends equally. As a result, the coil ends are likely to separate from the armature core. This causes gaps on the commutator surfaces, resulting in poor commutation. Further, power output is lessened. Also, wear of brushes increases, thereby reducing lives of the brushes.

When the collar moves from the predetermined position and is unable to press the coil ends, the coil ends vibrate. With this, insulator interposed between the pressing portion and the coil ends are damaged. As a result, the coils are likely to short one another through the collar.

SUMMARY OF THE INVENTION

The present invention is made in view of the above disadvantages, and it is an object of the present invention to provide a rotary electric machine in which a collar is restricted from moving due to thermal expansion of coil ends.

It is another object of the present invention to provide a rotary electric machine in which a collar presses against coil ends that construct a commutator even when the coil ends expand or contract due to thermal deformation of coils.

According to a rotary electric machine of the present invention, a plurality of unit coils is mounted on an armature core supported by a rotation shaft and constructs an armature coil. Each unit coil includes a lower layer coil and an upper layer coil arranged in double layers. Coil ends of the lower layer coils and the upper layer coils are located parallel to an axial end surface of the armature core. A pressing member for pressing the coil ends toward the armature core includes a cylindrical portion fitted on the rotation shaft, a flange radially extending from the cylindrical portion and a pressing portion in contact with an insulator interposed between the coil ends and the pressing portion.

Even when the coil ends expand and contract in the axial direction due to thermal deformation of the coils, the pressing portion presses against the coil ends toward the armature core through the insulator by resiliency of the flange and the cylindrical portion is maintained at a predetermined position on the rotation shaft.

Accordingly, since expansion of the coil ends is restricted by the pressing member, axial end surfaces of the coil ends of the upper layer coils on which brushes slide-contact can be maintained smooth. Therefore, poor contact or poor commutation of the brushes is decreased. Further, wear of brushes is suppressed. In addition, since the pressing portion presses against the coil ends through the insulator, vibrations of the coil ends are restricted. Therefore, damage to the insulator is decreased.

Alternatively, a pressing member for pressing the coil ends toward the armature core includes a cylindrical portion fixed on the rotation shaft. The rotation shaft includes a restricting member for restricting the cylindrical portion from moving in a direction separating from the armature core. Accordingly, even when the coil ends expand, the cylindrical portion is restricted from moving in the direction separating from the armature core and the pressing portion presses against the coil ends.

BRIEF DESCRIPTION OF THE DRAWINGS

Other objects, features and advantages of the present invention will become more apparent from the following detailed description made with reference to the accompanying drawings, in which.

DETAILED DESCRIPTION OF EMBODIMENT

Embodiments of the present invention will be described hereinafter with reference to the drawings.

[First Embodiment]

Figure 1:
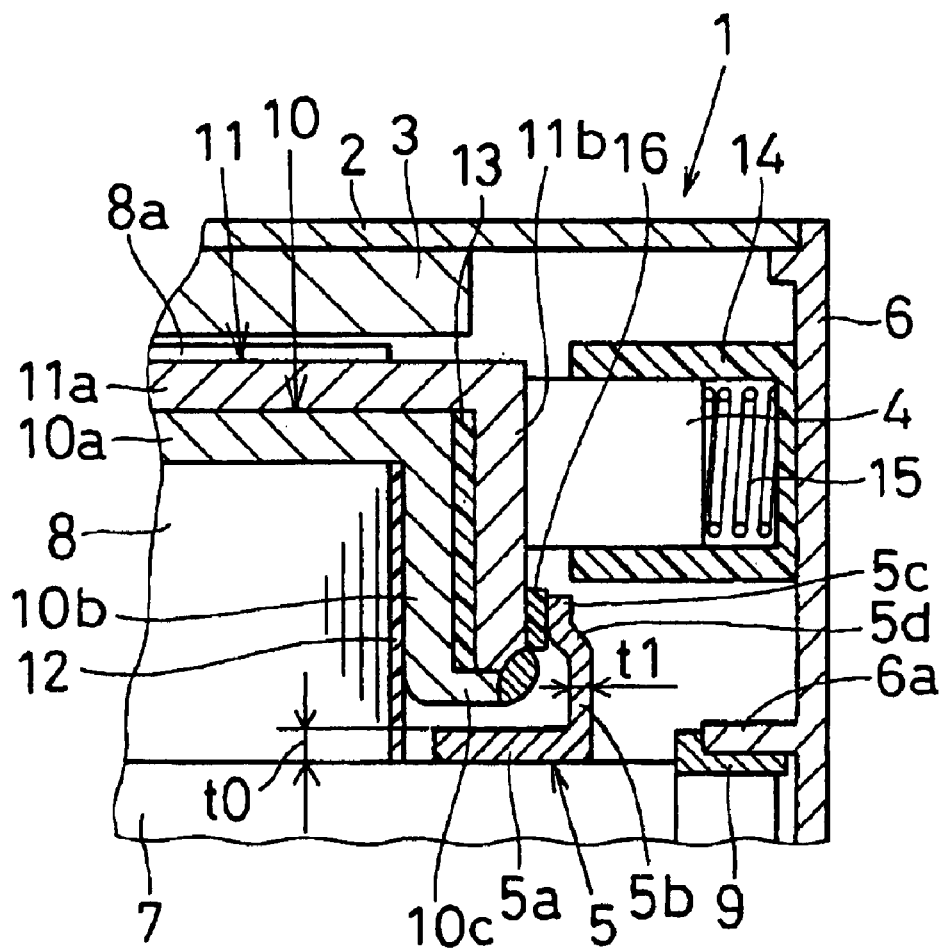
FIG. 1 is a cross-sectional view of a main part of a rotary electric machine according to the first embodiment of the present invention.

Referring to FIG. 1, a rotary electric machine 1 is a starting motor used for a speed reducing-type starter, for example. The rotary electric machine 1 is constructed of a magnetic field unit including a yoke 2 and a fixed magnetic pole 3, an armature, brushes 4, a collar 5 and the like. The fixed magnetic pole 3 is fixed in an inner periphery of the yoke 2. The armature is located in the inner periphery of the fixed magnetic pole 3 and supplied with electricity by the brushes 4. The collar 5 is a pressing member.

The yoke 2 is made of a ferromagnetic material such as a steel sheet. The yoke 2 has a substantially cylindrical shape. One end (rear end) of the yoke 2 is closed with an end frame 6. The fixed magnetic pole 3 includes a plurality of permanent magnets, for example. The permanent magnets are arranged on the inner peripheral wall of the yoke 2 at equal intervals in the circumferential direction.

The armature includes a rotation shaft 7, an armature core 8 supported by the rotation shaft 7, and an armature coil mounted on the armature core 8. The rotation shaft 7 is rotatably supported by bearings at both axial ends. In FIG. 1, only one bearing 9, which is on a rear side, is illustrated. The bearing 9 is press-fit in a boss portion 6a that is formed on the end frame 6 for receiving the bearing 9.

The armature core 8 is constructed of a stack of a plurality of disc-shaped thin steel plates. The armature core 8 is press-fit around the rotation shaft 7 to rotate with the rotation shaft 7. The armature core 8 has a predetermined number (e.g. twenty-five) of slots 8a on its outer periphery. Each of the slots 8a is formed along the axial direction of the armature core 8. The slots 8a are spaced at equal intervals in the circumferential direction of the armature core 8.

The armature coil is constructed of a plurality of unit coils made of copper, which has low electrical resistance. Each of the unit coils includes a lower layer coil 10 and un upper layer coil 11 arranged in double layers, as shown in FIG. 1. The coils 10, 11 have substantially U-shapes. The lower layer coil 10 has a lower layer coil trunk 10a and a pair of lower layer coil ends 10b extending from the ends of the trunk 10a. The upper layer coil 11 has an upper layer coil trunk 11a and a pair of upper layer coil ends 11b extending from the ends of the trunk 11a.

The lower layer coil 10 is arranged such that the trunk 10a is installed in the slot 8a through a slot insulation paper (not shown), and the coil ends 10b are extended in parallel with axial end surfaces of the armature core 8 and toward the rotation shaft 7. The lower layer coil 10 has protrusions 10c each protruding from an end of the coil end 10b in the axial direction to have electrical connection with the upper layer coil 11. Disc-shaped insulation plates 12 are fixed around the rotation shaft 7 on the axial end surfaces of the armature core 8 to insulate between the lower layer coil ends 11b and the armature core 8.

The upper layer coils 11 are installed in the slot 8a after the installation of the lower layer coils 10. Each upper layer coil 11 is arranged such that the upper layer coil trunk 11a is installed in the slot 8a through an insulation paper (not shown) and the upper layer coil ends 11b are placed axially outside the lower layer coil ends 10b and substantially in parallel with the lower layer coil ends 10 toward the rotation shaft 7. One side of the upper layer coil ends 11b (rear side coil ends 11b shown in FIG. 1) is used as the commutator. The brushes 4 are arranged to be in contact with the axial end surfaces of the upper layer coil ends 11b, as shown in FIG. 1.

Disc-shaped insulation plates 13 are fixed around the protrusions 10c and between the lower layer coil ends 10b and the upper layer coil ends 11b to insulate between the upper layer coil ends 11b and the lower layer coil ends 10b. Ends of the upper layer coil ends 11b are electrically and mechanically connected to the protrusions 10c such as by tungsten insert gas arc welding, so that the lower layer coils 10 and the upper layer coils 11 construct the armature coil.

The brushes 4 are slidablly held in brush holders 14 fixed on the inside surface of the end frame 6. The brushes 4 are pressed toward the commutator surfaces, which are the axial end surfaces of the upper layer coil ends 11b, by brush springs 15. The brush holders 14 are, for example, made of heat resistance resin.

The collar 5 is to restrict the coil ends 10b and 11b from expanding or separating from the axial end surface of the armature core 8 by receiving a centrifugal force when the armature rotates. The collar 5 includes a boss 5a, a flange 5b and a pressing portion 5c. The boss 5a has a substantially cylindrical shape. The boss 5a is press-fit around the rotation shaft 7 axially outside of the armature core 8. The flange 5b radially extends from the boss 5a. The pressing portion 5c is formed on outer periphery of the flange 5b. An insulation ring 16 is interposed between the pressing portion 5c and the upper layer coil ends 11b. The pressing portion 5c presses against the coil ends 10b, 11b toward the armature core 8 through the insulation ring 16. The collar 5 has a step 5d between the flange 5b and the pressing portion 5c so that the connecting portion of the upper layer coil ends 11b and the protrusions 10c does not contact the flange 5b. The pressing portion 5c is closer to the armature core 8 than the flange 5b.

Figure 2A:
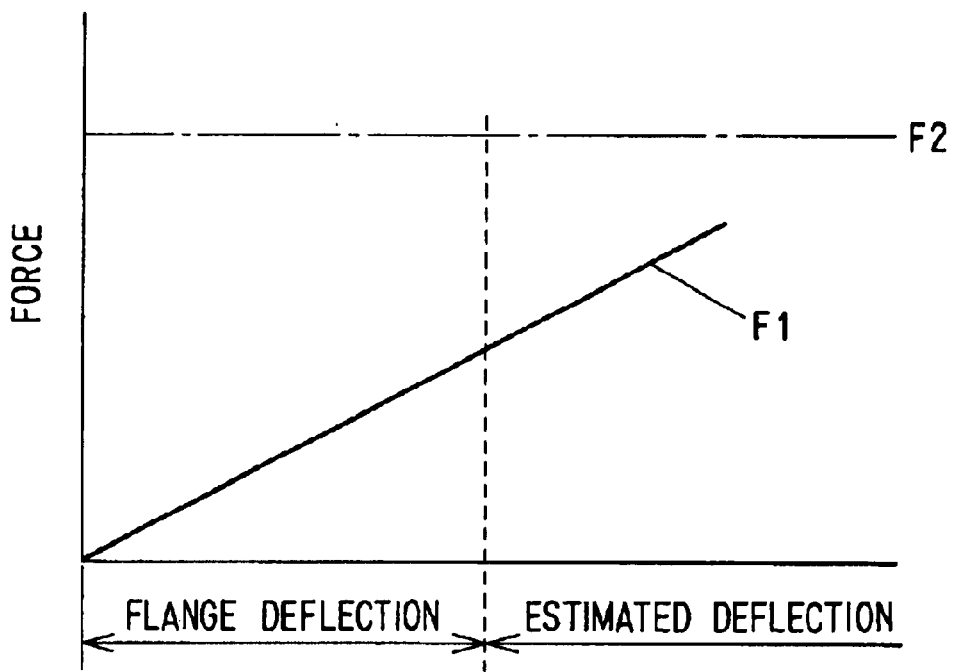
FIG. 2A is a graph showing characteristic relations between flange deflection and a force applied to a boss, according to the first embodiment of the present invention.
Figure 2B:
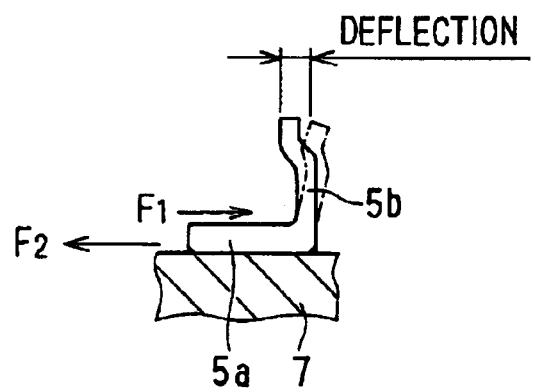
FIG. 2B is a cross-sectional view of a collar according to the first embodiment of the present invention.

The collar 5 is designed such that the flange 5b bends to absorb the axial movement of the coil ends 10b, 11b when the coil ends 10b, 11b expand in the axial direction of the rotation shaft 7 due to temperature increase of the coils 10, 11. In FIG. 2A, F1 is a force that is caused by the deflection (estimate maximum deflection) of the flange 5b and applied to the boss 5a in a direction removing the collar 5 from the rotation shaft 7, that is, a direction that the collar 5 separates from the armature core 8. F2 is a removing force of the boss 5a with respect to the rotation shaft 7. That is, F2 is a force required to remove the boss 5a from the rotation shaft 7. As shown in FIG. 1, the thickness t0 of the boss 5a is greater than the thickness t1 of the flange 5b, so that the force F2 is greater than the force F1. The collar 5 is made such as by pressing and cold forging.

The force F1 is determined from the following equation.

$$F1 = \epsilon \cdot E \cdot A$$

Here, $\epsilon$ is a distortion factor by thermal expansion. E is Young's modulus of copper, which makes the unit coils. A is a surface area of pressing portion 5c contacting with the insulation ring 16.

As shown in FIG. 2A, with an increase of the flange deflection, the force F1 to the boss 5a increases. The maximum deflection of the flange 5b is determined based on a maximum temperature generated in a rated power output of the rotary electric machine 1 (during a rated time operation). Therefore, the force F2 is determined to be larger than the force F1 caused by the maximum deflection of the flange 5b.

Next, operation and advantages of the present invention are described.

When the armature coil is supplied with electricity, the coils 10, 11 generate heat and thermally expand. The collar 5 absorbs the axial displacement of the coil ends 10b, 11b due to thermal expansion by the deflection of the flange 5b. Since the collar 5 is designed such that the force F2 is greater than the force F1, the boss 5a is maintained at the predetermined position without moving in the axial direction of the rotation shaft 7.

Even when the coil ends 10*b*, 11*b* expand and contract in the axial direction due to the thermal deformation of the coils 10, 11, the pressing portion 5*c* still presses against the coil ends 10*b*, 11*b* through the insulation ring 16 by resilience of the flange 5*b*. Therefore, the coil ends 10*b*, 11*b* are restricted from being expanded or separated from the axial end surface of the armature core 8 by the centrifugal force when the armature rotates.

Accordingly, the commutator surfaces can be maintained smooth. As a result, poor contact (poor commutation) of the brushes 4 to the commutator surfaces is decreased and wear of brushes 4 is suppressed. In addition, since the pressing portion 5*c* always presses against the coil ends 10*b*, 11*b* toward the armature core 8 through the insulation ring 16, vibrations of the coil ends 10*b*, 11*b* can be decreased. As a result, damage to the insulation ring 16 is decreased.

In addition, the step 5*d* is formed between the flange 5*b* and the pressing portion 5*c* so that the pressing portion 5*b* is closer to the insulation ring 16 than the flange 5*b*. In this case, resiliency of the flange 5*b* can be changed in accordance with a change in a dimension of the step 5*d*, that is, a distance between the flange 5*b* and the pressing portion 5*c* in the axial direction. Therefore, it is possible to change the dimension of the step 5*d* in correspondence to the rated output power of the rotary electric machine. That is, it is possible to use the collar 5 to another rotary electric machine having a different rated power output, that is, a different thermal expansion ratio of coils, by changing the dimension of the step.

[Second Embodiment]

Figure 3:
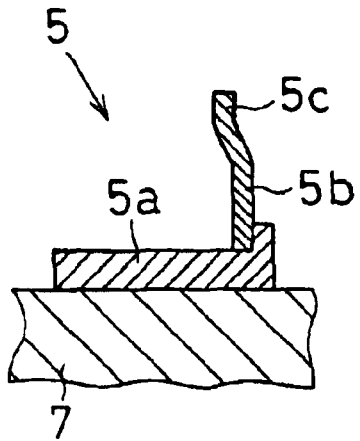
FIG. 3 is a cross-sectional view of a collar according to the second embodiment of the present invention.

As shown in FIG. 3, the boss 5*a* is separate from the flange 5*b* and the pressing portion 5*c*. Because the boss 5*a* can be formed of a material different from that of the flange 5*b* and the pressing portion 5*c*, advantages of the collar 5 can be improved. For example, the boss 5*a* is formed of a cold forging material and the flange 5*b* and the pressing portion 5*c* are formed of spring steel. With this, the boss 5*a* increases a fixing force with respect to the rotation shaft 7. Further, the flange 5*b* increases its resiliency.

[Third Embodiment]

Figure 4:
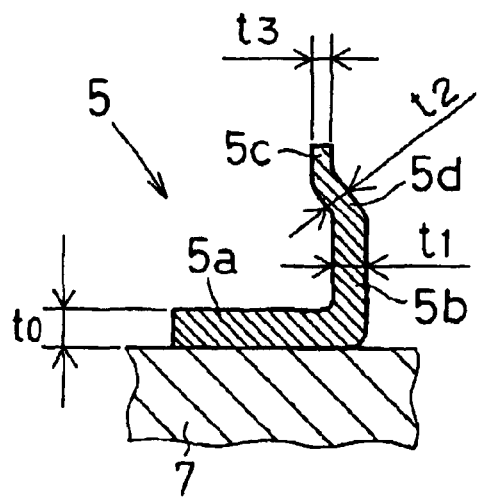
FIG. 4 is a cross-sectional view of a collar according to the third embodiment of the present invention.

As shown in FIG. 4, the thickness is gradually changed from the flange 5*b* to the pressing portion 5*c*, in the collar 5. The thickness t1 of the flange 5*b*, the thickness t2 of the step 5*d* and the thickness t3 of the pressing portion 5*c* are determined such that t1 is greater than t2 and t2 is greater than t3 (t1>t2>t3). Also in this embodiment, the thickness t0 of the boss 5*a* is greater than the thickness t1 of the flange 5*b* (t0>t1).

Accordingly, differences of stresses applied to each portion are reduced from the flange 5*b* toward the pressing portion 5*c*. Therefore, a lineality of force characteristic with respect to the deflection of the flange 5*b* is improved.

[Fourth Embodiment]

Figure 5:
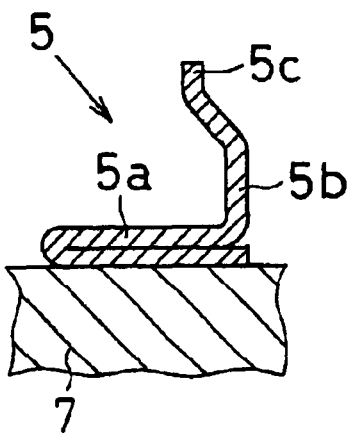
FIG. 5 is a cross-sectional view of a collar according to the fourth embodiment of the present invention.

As shown in FIG. 5, the collar 5 is made of a thin plate. In this case, the boss 5*a* is formed by folding the thin plate in two layers so that the boss 5*a* has a thickness greater than that of the flange 5*b*.

In this structure, a large force is not required when the collar 5 is produced by pressing. Therefore, costs for facilities and dies are reduced.

[Fifth Embodiment]

Figure 6:
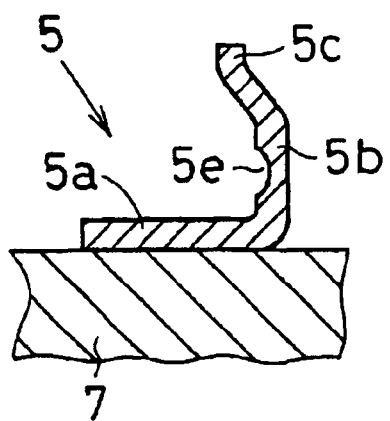
FIG. 6 is a cross-sectional view of a collar according to the fifth embodiment of the present invention.

As shown in FIG. 6, the flange 5*b* has a recession 5*e* on its surface adjacent to the armature core 8.

In this case, it is possible to control relations between the deflection of the flange 5*b* and the force applied to the boss 5*a* by changing a position of the recession 5*e* in the radial direction of the flange 5*b*. The change in the thickness of the material used to make the collar 5 is measured prior to the pressing. Then, the recession 5*e* is formed by pressing at a different position by exchanging only a die. Therefore, even when the plate having a large thickness variation, the collar 5 having a stable deflection and force characteristic can be manufactured.

[Sixth Embodiment]

Figure 7:
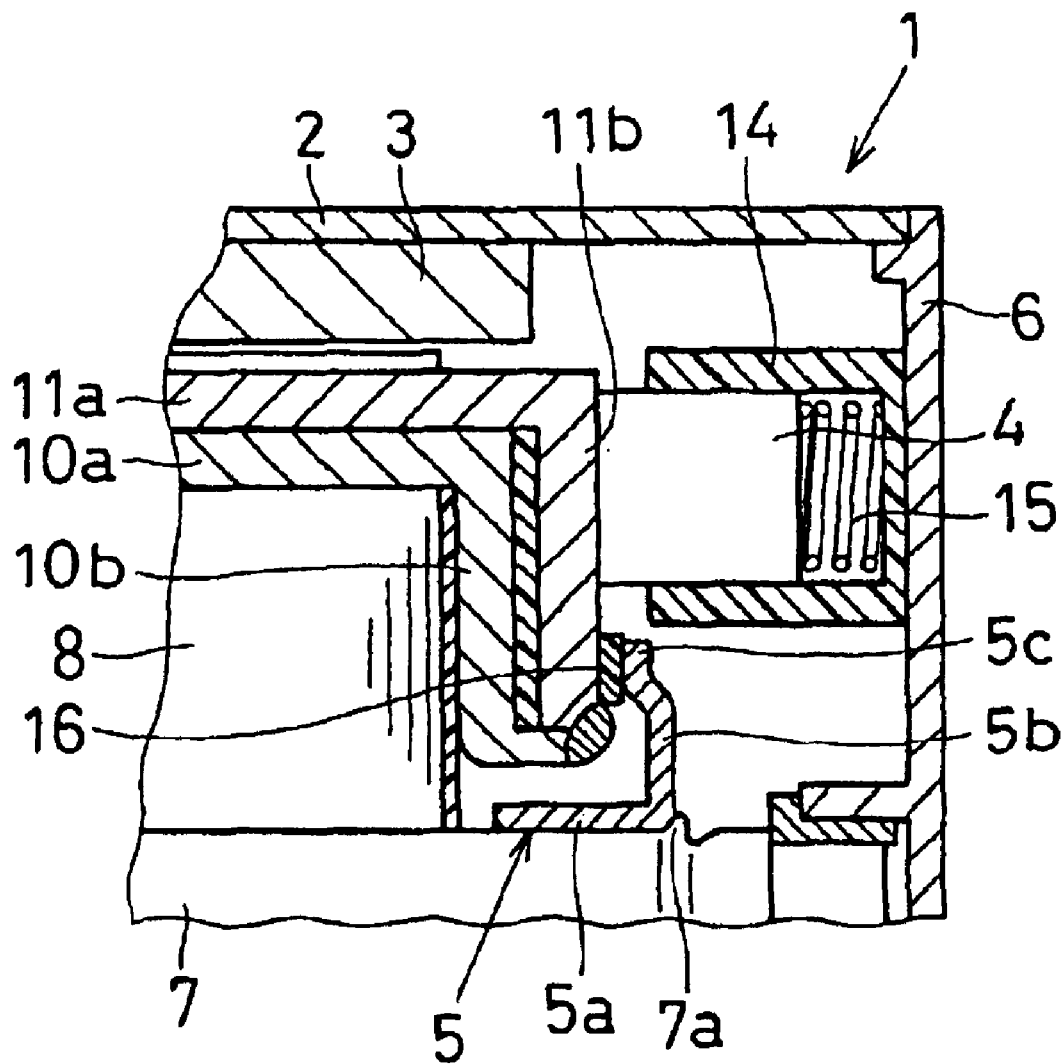
FIG. 7 is a cross-sectional view of a main part of the rotary electric machine according to the sixth embodiment of the present invention.

As shown in FIG. 7, a restricting means 7*a* is formed on the rotation shaft 7 for restricting the axial movement of the collar 5. For example, the restricting means 7*a* is a stopper formed on the outer circumference of the rotation shaft 7 by plastic working. After the collar 5 is press-fit around the rotation shaft 7, the stopper 7*a* is formed to rise from the outer circumferential surface of the rotation shaft 7 axially outside of the collar 5 by plastic working. With this, the boss 5*a* is restricted from moving in the direction separating from the armature core 8 (to the right side in FIG. 7).

In this structure, fixing force of the boss 5*a* to the rotation shaft 7 can be reduced, so the tolerance of the inside diameter of the boss 5*a* can be eased. Therefore, manufacturing costs of the collar 5 is reduced. Further, even if the coil ends 10*b*, 11*b* expand or contract due to the thermal deformation of the coils 10, 11, the pressing portion 5*d* presses against the coil ends 10*b*, 11*b* toward the armature core 8.

The present invention should not be limited to the disclosed embodiments, but may be implemented in other ways without departing from the spirit of the invention.

What is claimed is:

1. A rotary electric machine, comprising:

a rotation shaft;

an armature core supported by the rotation shaft;

a plurality of unit coils constructing an armature coil, each of the unit coils including a lower layer coil and an upper layer coil that are mounted on the armature core in double layers, the lower layer coil and the upper layer coil each including a coil end located parallel to an axial end surface of the armature core;

brushes being in contact with axial end surfaces of the coil ends of the upper layer coils; and a pressing member for pressing the coil ends toward the armature core, wherein the pressing member includes a cylindrical portion fitted on the rotation shaft, a flange radially extending from the cylindrical portion, and a pressing portion formed on an outer periphery of the flange to be in contact with an insulator interposed between the coil ends and the pressing portion, wherein the pressing portion presses against the coil ends through the insulator by resiliency of the flange and the cylindrical portion is maintained at a predetermined position on the rotation shaft, even when the coil ends axially expand and contract due to thermal deformation of the unit coils, and the pressing member is designed such that a force required to remove the cylindrical portion from the rotation shaft is greater than a force that is applied to the cylindrical portion in a direction separating the cylindrical portion from the armature core by the resiliency of the flange.

2. The rotary electric machine according to claim 1, wherein the pressing member includes a step between the flange and the pressing portion such that the pressing portion is closer to the insulator than the flange.

3. The rotary electric machine according to claim 2, wherein a thickness of the flange is greater than that of the step and a thickness of the step is greater than that of the pressing portion.

4. The rotary electric machine according to claim 1, wherein the cylindrical portion has a thickness greater than that of the flange.

5. The rotary electric machine according to claim 1, wherein:

the pressing member is in a form of a ring having a L-shaped cross section, the L-shape being formed by the cylindrical portion and the flange, and the pressing portion has a pressing surface, said pressing surface being the same continuous surface as a flange surface of the flange, which is generally parallel to said pressing surface.

6. The rotary electric machine according to claim 5, wherein the pressing portion is provided such that the pressing surface is closer to the coil ends than the flange surface.

7. The rotary electric machine according to claim 1, wherein the cylindrical portion is press-fitted to the rotation shaft up to a position at which the flange is resiliently deformed so that the pressing portion is kept being biased against the coil ends.

8. The rotary electric machine according to claim 1, further comprising:

a frame supporting the rotation shaft;

wherein the pressing member is fixed on the rotation shaft at a position separate from the frame.

9. A rotary electric machine, comprising:

a rotation shaft;

an armature core supported by the rotation shaft;

a plurality of unit coils constructing an armature coil, each of the unit coils including a lower layer coil and an upper layer coil that are mounted on the armature core in double layers, the lower layer coil and the upper layer coil each including a coil end located parallel to an axial end surface of the armature core;

brushes being in contact with axial end surfaces of the coil ends of the upper layer coils; and a pressing member for pressing the coil ends toward the armature core, wherein the pressing member includes a cylindrical portion fixed around the rotation shaft, and the rotation shaft includes a restricting member on an outer circumferential surface of the rotation shaft, thereby restricting the cylindrical portion from moving in a direction separating from the armature core, and the restricting member is a stopper formed to rise from the outer circumferential surface of the rotation shaft by a plastic working.

10. The rotary electric machine according to claim 9, wherein the pressing member includes a flange radially extending from the cylindrical portion and a pressing portion on an outer periphery of the flange, wherein the pressing portion presses against the coil ends toward the armature core through an insulator when the coil ends expand and contract in an axial direction.

11. The rotary electric machine according to claim 9, wherein:

the pressing member is in a form of a ring having a L-shaped cross section, the L-shape being formed by the cylindrical portion and the flange, and the pressing portion has a pressing surface, said pressing surface being the same continuous surface as a flange surface of the flange, which is generally parallel to said pressing surface.

12. The rotary electric machine according to claim 11, wherein the pressing portion is provided such that the pressing surface is closer to the coil ends than the flange surface.

13. The rotary electric machine according to claim 9, wherein the cylindrical portion is press-fitted to the rotation shaft up to a position at which the flange is resiliently deformed so that the pressing portion is kept biased against the coil ends.

14. The rotary electric machine according to claim 9, further comprising:

a frame supporting the rotation shaft;

wherein the pressing member is fixed on the rotation shaft at a position separate from the frame.

* * * * *